(12) United States Patent
Werner et al.

(10) Patent No.: US 10,556,483 B2
(45) Date of Patent: Feb. 11, 2020

(54) HOLDING APPARATUS FOR SECURING A FAN FOR COOLING A COMPONENT OF A VEHICLE

(71) Applicant: Dr. Ing. h.c. F. Porsche Aktiengesellschaft, Stuttgart (DE)

(72) Inventors: Michael Werner, Besigheim (DE); Heinz Rebholz, Neuhausen ob Eck (DE); Alexander Klausmann, Schönaich (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 248 days.

(21) Appl. No.: 15/596,338

(22) Filed: May 16, 2017

(65) Prior Publication Data
US 2017/0334265 A1 Nov. 23, 2017

(30) Foreign Application Priority Data

May 20, 2016 (DE) .......................... 10 2016 109 346

(51) Int. Cl.
*F04D 29/60* (2006.01)
*B60H 1/00* (2006.01)
(Continued)

(52) U.S. Cl.
CPC ........... *B60H 1/00564* (2013.01); *B60H 1/34* (2013.01); *F04D 17/16* (2013.01); *F04D 29/023* (2013.01);
(Continued)

(58) Field of Classification Search
CPC ..... B60H 1/00564; B60H 1/34; F04D 29/601; F04D 29/4206; F04D 29/023; F04D 17/16; F04D 29/626
See application file for complete search history.

(56) References Cited

U.S. PATENT DOCUMENTS 5,181,832 A * 1/1993 Reents .................. B05B 7/2491
  417/234
5,474,422 A * 12/1995 Sullivan .............. F04D 29/4233
  415/182.1
(Continued)

FOREIGN PATENT DOCUMENTS

CN  2396097 Y   9/2000
CN  1873233 A  12/2006
(Continued)

OTHER PUBLICATIONS

German Search Report for German Application No. 10 2016 109 346.7, dated Feb. 27, 2017, 7 pages, with partial English translation.
(Continued)

*Primary Examiner* — Dwayne J White
*Assistant Examiner* — Adam W Brown
(74) *Attorney, Agent, or Firm* — RatnerPrestia

(57) ABSTRACT

A holding apparatus for securing a fan for cooling a component of a vehicle, having a main body made from foam material. The main body has a fan receptacle for receiving the fan in a positively locking manner at least in sections. The fan receptacle has an air inlet for feeding in air to the fan and an air outlet for discharging air from the fan. The main body also has at least one inlet opening with an adjoining inlet duct and at least one outlet opening with an adjoining outlet duct. The inlet duct is in a fluid-communicating connection with the air inlet and the outlet duct is in a fluid-communicating connection with the air outlet.

15 Claims, 3 Drawing Sheets

(51) Int. Cl.
*B60H 1/34* (2006.01)
*F04D 17/16* (2006.01)
*F04D 29/02* (2006.01)
*F04D 29/42* (2006.01)
*F04D 29/62* (2006.01)

(52) U.S. Cl.
CPC ....... *F04D 29/4206* (2013.01); *F04D 29/601* (2013.01); *F04D 29/626* (2013.01)

(56) References Cited

U.S. PATENT DOCUMENTS

| | | | |
|---|---|---|---|
| 5,644,472 A | 7/1997 | Klein | |
| 5,682,289 A | 10/1997 | Schwegler | |
| 6,216,691 B1 * | 4/2001 | Kenyon | A61M 16/0057 128/204.18 |
| 6,773,477 B2 * | 8/2004 | Lindsay | B01D 46/0023 55/385.3 |
| 6,929,312 B2 * | 8/2005 | Rich | B60H 1/0055 296/187.02 |
| 7,617,823 B2 * | 11/2009 | DiMatteo | A61M 16/0066 128/204.18 |
| 9,044,559 B2 * | 6/2015 | Grasmuck | A61M 16/0066 |
| 9,099,728 B2 | 8/2015 | Kattner | |
| 2006/0171804 A1 * | 8/2006 | Brown | F04D 29/545 415/220 |
| 2015/0176860 A1 * | 6/2015 | Hattan | F24H 3/0405 392/368 |

FOREIGN PATENT DOCUMENTS

| | | |
|---|---|---|
| DE | 3822232 C1 | 1/1990 |
| DE | 19944308 A1 | 6/2001 |
| DE | 10132602 A1 | 11/2002 |
| DE | 202004017722 U1 | 2/2005 |
| DE | 102006049031 A1 | 4/2008 |
| DE | 102011013652 A1 | 9/2012 |

OTHER PUBLICATIONS

Chinese Office Action for Chinese Application No. 2017103475951, dated Dec. 4, 2018, 7 pages.
English Translation of the Chinese Office Action for Chinese Application No. 2017103475951, dated Jul. 3, 2019, 8 pages.
Indian Examination Report for Indian Application No. 201714013751, dated Sep. 2, 2019, with translation, 8 pages.
Chinese Office Action for Chinese Application No. 201710347595. 1, dated Nov. 5, 2019, with translation, 14 pages.

* cited by examiner

HOLDING APPARATUS FOR SECURING A FAN FOR COOLING A COMPONENT OF A VEHICLE

CROSS-REFERENCE TO RELATED APPLICATIONS

This application claims priority to German Patent Application No. 102016109346.7, filed May 20, 2016, the content of such application being incorporated by reference herein in its entirety.

FIELD OF THE INVENTION

The present invention relates to a holding apparatus for securing a fan for cooling a component of a vehicle, to a fan module for cooling a component of a vehicle, and to a method for mounting a fan module of this type.

BACKGROUND OF THE INVENTION

It is known that a multiplicity of components which require cooling exist in vehicles. These are, in particular, electric components which are subjected to a heating process as a result of their electric operation. Components are provided here which are cooled both in a passive way and in an active way. Active cooling is usually ensured by way of active ventilation, in particular in the case of electric components. Fans of this type are provided with fan impellers which provide forced convection of air flow which is sucked in and conveyed further. In other words, fans of this type serve to suck in air from a cooler location and to convey said air, which is cooler in relation to the component to be cooled, onto the cooling surfaces of said component.

It is disadvantageous in the known solutions that the mounting of fans of this type usually takes place directly within the vehicle. This therefore means that the fan is fastened directly to the vehicle and, from there, provides the desired forced convection air flow onto the component to be cooled. This comprises a plurality of disadvantages. Firstly, there is an increased complexity for relative positioning here between the fan on one side and the surface to be cooled of the component to be cooled on the other side. For this purpose, additional guide surfaces and/or guide plates are frequently used, in order for it to be possible to also guide the air flow in a desired way with precise targeting onto the component to be cooled. A further disadvantage is the high complexity with regard to the acoustic damping which has to be carried out. Fans necessarily have a rotating component, namely the fan impeller. Said rotation which can be provided by way of a corresponding rotary bearing apparatus necessarily leads to acoustic emissions which can possibly be perceived to be disadvantageous in the vehicle. In order to avoid this, high complexity with regard to installation space, material and weight is necessary, in order for it to be possible to provide corresponding damping.

SUMMARY OF THE INVENTION

In view of the above-described disadvantages, it would be advantageous to provide a holding apparatus for a fan in an inexpensive and simple way, which holding apparatus reduces the installation space and preferably also comprises acoustic decoupling.

According to aspects of the invention, a holding apparatus is proposed for securing a fan for cooling a component of a vehicle. A holding apparatus of this type has a main body made from foam material. The main body is equipped with a fan receptacle for receiving the fan in a positively locking manner at least in sections. The fan receptacle has an air inlet for feeding in air to the fan and an air outlet for discharging air from the fan. Here, furthermore, the main body is equipped with an inlet opening with an adjoining inlet duct and at least one outlet opening with an adjoining outlet duct. The inlet duct is in a fluid-communicating connection with the air inlet, and the outlet duct is in a fluid-communicating connection with the air outlet.

In contrast with the known solutions which provide direct mounting of the fan on corresponding structural components of the vehicle, a holding apparatus is now provided in a manner according to aspects of the invention. One core concept of said holding apparatus is the configuration of the main body from a foam material. In the context of the present invention, a foam material is to be understood to mean a material which has a matrix material which has closed and/or open pores. Here, the foam material can have a very wide variety of elastic or solid properties. As will still be explained later, the foam material is equipped, in particular, with an elastic material property. Combined foam materials which have a different modulus of elasticity of the matrix in different sections of the main body are also conceivable within the context of the present invention, however.

Various functionalities are configured in said foam material of the main body. Firstly, this is here the receptacle and therefore the mounting functionality for the fan. The fan receptacle can also be called a mounting interface. Said fan receptacle serves to receive the fan. The fan is received in a positively locking manner at least in sections, with the result that mounting and therefore, as a result of the positively locking connection at least in sections, even fastening of the fan can be carried out in said fan receptacle. In combination with a main body made from an elastic foam material, this leads, as it were, to it being possible for the fan to be pressed into its positively locking position in the fan receptacle with elastic and reversible deformation of the main body. As soon as the fan has assumed its final position within the fan receptacle, the foam material around the fan will close again as a result of the elastic restoring forces and will finish the positively locking connection at least in sections. Therefore, the fan is situated in a manner which is received in a positively locking manner at least in sections and is therefore now finally mounted in its desired position in the fan receptacle.

It is clear from the above explanation that a holding apparatus can entail great advantages not only with regard to the actual use, but even with regard to the mounting functionality and the production.

Furthermore, the guide functionality for the air is provided in the main body of the holding apparatus. This is firstly the guidance of the air flow from an air source or from an outer side of the holding apparatus toward the fan and secondly the guidance of the air from the fan to the desired component. The first part of the air guidance therefore serves, as it were, for sucking in relatively cold air through the air inlet into the fan. In order for it to be possible to provide the corresponding guidance, the adjoining inlet duct is provided in addition to an inlet opening in the main body, which inlet duct, at its other end downstream of the air flow, opens into the air inlet of the fan receptacle and therefore into the corresponding inlet of the fan. On the opposite side, the pressure-loaded side of the fan, the air flow is then guided via the fan outlet and an adjoining outlet duct to the at least one outlet opening, via the at least one outlet duct.

As will still be explained later, the outlet opening can preferably have an oriented position, in order for it to be possible to eject the air flow from it in a manner which is directed in a defined way relative to the holding apparatus.

As can be seen in the preceding text, an improved guidance functionality is also provided in addition to simplified mounting and relative positioning of the fan with respect to the holding apparatus. The functionality of the guidance of the air flow and the functionality of the fastening of the fan are therefore internalized in a single component, namely the main body of the holding apparatus. This already leads to an improved utilization of the existing installation space, to a reduced number of parts, and to a weight saving.

Depending on the actual material selection, a further advantage is achieved by way of the foam-like configuration of the material of the main body. An acoustic functionality of the main body is provided by way of the combination of a matrix with closed and/or open pores in the foam material of the main body. Vibrations which are produced by the fan during operation of the latter, in particular as a result of the rotation of the fan impeller, are output to the main body by way of the corresponding positively locking receiving section. As a result of the foam-like configuration of the main body, said vibrations can then be dissipated and attenuated within the foam material of the main body with regard to their amplitude and/or with regard to their frequency. This leads as a result to the foam material of the main body leading to acoustic decoupling or to partial acoustic decoupling of the fan from the adjoining components of the vehicle. If, as will still be explained later, the main body is then fastened to an adjoining structural component of the vehicle, the foam material serves with regard to the acoustic transmission to introduce corresponding sound waves into the vehicle in a manner which is reduced with regard to the amplitude and is therefore damped.

It can be advantageous if, in the case of a holding apparatus according to aspects of the invention, the fan receptacle for receiving at least sections of the fan in a positively locking manner has at least one positively locking section, the positively locking section having the air inlet and/or the air outlet. The air inlet and/or the air outlet form/forms, as it were, the interfaces for the guidance functionality of the air flow for sucking in and/or outputting the air flow by way of the fan. In this case according to aspects of the invention, the air inlet and/or the air outlet are/is then configured in the positively locking section in this embodiment. This therefore means that the fan bears against the inner-side surface of the fan receptacle in a positively locking manner in the region of the positively locking section. If, as in said embodiment, the corresponding aperture, that is to say the air inlet and/or the air outlet, is then part of said positively locking section, this leads to corresponding counter-surfaces of the fan bearing in a contacting manner against the surface sections which border the air inlet and/or the air outlet. This positively locking correlation therefore ensures the sealing action between the inserted fan on one side and the foam material of the main body on the other side over the full circumference around the air inlet and/or the air outlet. If, moreover, a foam material is deformed in an elastic manner in said region of the positively locking section during the insertion into said foam material, a sealing force is provided, moreover, which comes from the elastic restoring forces of the foam material in said positively locking section.

Furthermore, it can be advantageous if, in the case of a holding apparatus according to aspects of the invention, on its outer side, the main body has at least one fastening section for fastening to the vehicle. A fastening section of this type can provide the fastening functionality in a direct or indirect way. In an indirect way, the fastening section has corresponding openings, through which separate fastening means in the form of rivets, screws or fastening pins can be guided. Active or direct fastening by way of the fastening section is also conceivable if, for example, the fastening functionality is provided by way of correspondingly configured fastening means which are part of the main body. What are called snap/latch connections or positively locking parts can be mentioned as an example of this for fastening functionalities of the fastening section. The mounting of the fan or the entire holding apparatus or the fan module with the fan is simplified yet further in this way.

It can likewise be advantageous if, in the case of a holding apparatus according to aspects of the invention, on its outer side, the main body has at least one positioning section, in particular in the form of a positioning surface, for relative positioning of the holding apparatus in the vehicle. A positioning section serves to establish contact with an adjoining structural component of the vehicle in a flat manner. For fastening to a structural component of this type, the positioning section therefore serves to provide or unambiguously define the relative positioning of the holding apparatus and therefore also of the fan which is received in the holding apparatus with respect to said fastened structural component. Since all components within a vehicle usually have a defined relative position with respect to one another, this then leads to a corresponding component to be cooled also being positioned directly or indirectly relative to said structural component. Therefore, the positioning section serves to provide the relative positioning, in particular with regard to the orientation of the air flow through the outlet opening, in a defined way and to make it possible to ensure mounting in a facilitated way.

Furthermore, it is advantageous if, in the case of a holding apparatus according to aspects of the invention, the main body has at least two outlet openings, the outlet duct having two part outlet ducts which open into the two outlet openings. Only a single air outlet is usually provided for the fan. The outlet duct emanates in a manner which starts from said air outlet, in order to guide the air flow on the pressure side of the fan. A division of the outlet duct subsequently takes place into as many part outlet ducts as outlet openings which subsequently have to be supplied. Here, the individual flow cross sections of the part outlet ducts are preferably adapted to the flow outlet cross sections of the outlet openings. The division of the individual part outlet ducts is preferably provided in an identical way to one another, in order for it to be possible to load individual outlet openings with the same quantity of airflow.

Furthermore, it can be advantageous if, in the context of the present invention, in the case of the holding apparatus, the at least one outlet opening has a nozzle-shaped cross section for a directed and/or accelerated output of air flow. A nozzle-shaped cross section is to be understood to mean, in particular, a cross section which narrows over the flow course of the air flow. This leads firstly to the air flow through the narrowing free cross section being accelerated over the course of the flow by way of said nozzle-shaped cross section. At the same time, the acceleration also leads to a more pronounced orientation and/or a lower susceptibility to the action of lateral flow being provided. A nozzle-shaped configuration of the cross section of the at least one outlet opening therefore leads to it being possible for targeted cooling of the component to be cooled to be provided in an even more precise manner.

Furthermore, it can be advantageous if, in the case of a holding apparatus according to aspects of the invention, the foam material of the main body has an elastic matrix at least in sections. Said elastic matrix surrounds the closed and/or the open pores, with the result that both the mounting and the later use entail great advantages. For mounting, facilitated insertion of the fan can then be provided by way of elastic deformation of at least one part of the main body. The positively locking connection between the fan on one side and the main body of the holding apparatus on the other side is provided by way of subsequent elastic springback. An elastic matrix also has yet further advantages with regard to acoustic decoupling, and improves the acoustic decoupling, in particular with regard to the reduction of the transmitted frequencies and/or their amplitude.

Furthermore, it is advantageous if, in the case of a holding apparatus according to aspects of the invention, the main body has been produced in a cavity and has, in particular, PUR or PPE as material. In a cavity of this type, for example with the aid of an injection molding method, the corresponding material can be injected with the aid of a foamer. Subsequently, the delimitation and therefore the outer sides and also the inner sides of the main body are fixed by way of the walls of the cavity. After the foaming and at least partial hardening of the matrix material, the main body, which is then finished, of the holding apparatus can be removed from said cavity and can be fed into the further mounting process. This leads to particularly simple, inexpensive production possibilities which, moreover, can provide particularly light main bodies.

A fan module for cooling a component of a vehicle is likewise the subject matter of the present invention. A fan module of this type has a holding apparatus according to aspects of the invention, a fan being arranged in the fan receptacle. The blower outlet of the fan is in a fluid-communicating connection with the air outlet, and the blower inlet of the fan is in a fluid-communicating connection with the air inlet. A fan module according to aspects of the invention therefore entails the same advantages as have been explained in detail in relation to a holding apparatus according to aspects of the invention.

A further subject matter of the present invention is a method for mounting a fan module according to the present invention, having the following steps:

inserting a fan into a fan receptacle of a holding apparatus according to the present invention, and configuring a positively locking connection at least in sections between the fan and the fan receptacle.

The configuration of a fan module according to aspects of the invention and a fan module in use in a holding apparatus according to aspects of the invention achieve the same advantages as have already been described in detail in relation to the holding apparatus according to aspects of the invention. As a result of the insertion of the fan, an elastic deformation of the main body is carried out, in particular, if at least partially elastic foam material is used for said main body. Subsequently, after the final position of the fan in the fan receptacle is reached, the individual sections of the foam material are changed back into their original form by way of elastic restoring forces, and therefore configure the positively locking connection at least in sections in the final position.

BRIEF DESCRIPTION OF THE DRAWINGS

Further advantages, features and details of the invention result from the following description, in which exemplary embodiments of the invention are described in detail with reference to the drawings. In the drawings, diagrammatically.

DETAILED DESCRIPTION OF THE INVENTION

Figure 1:
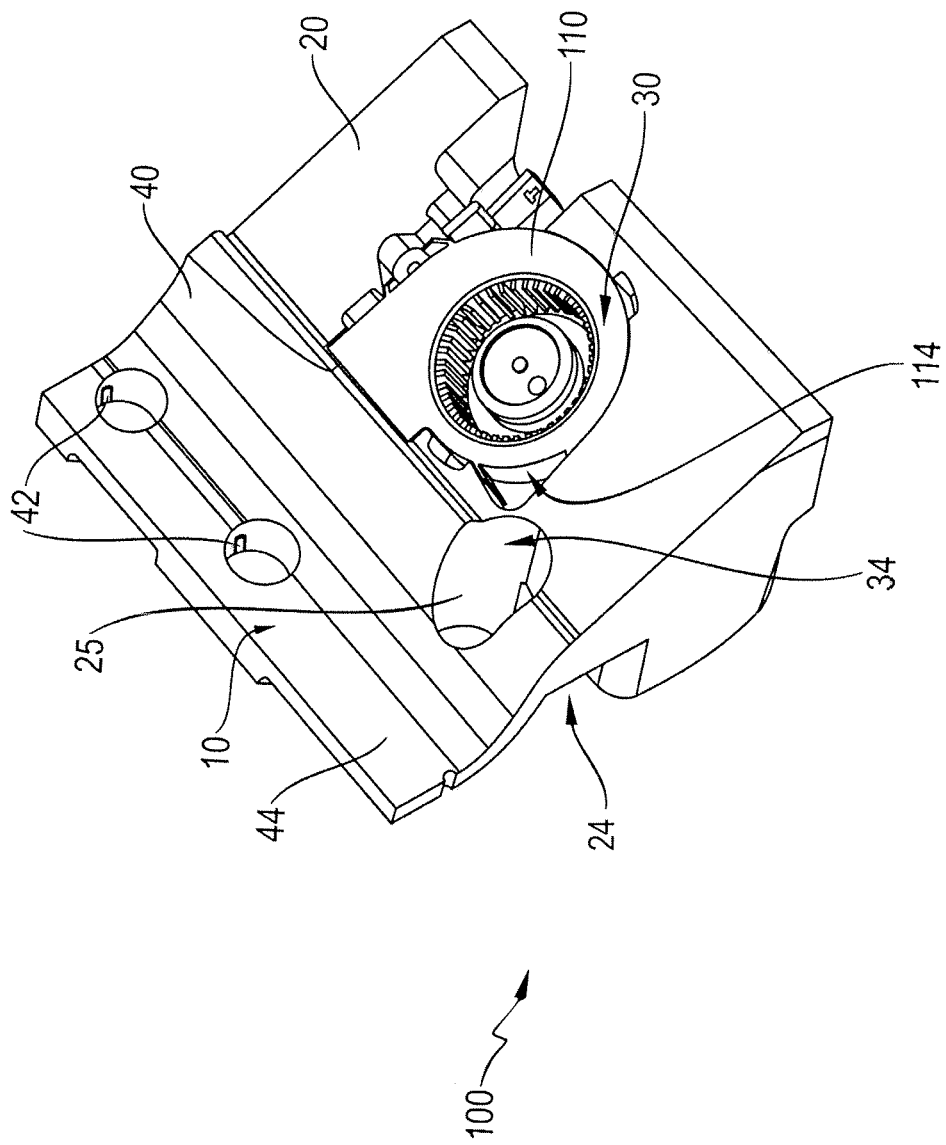
FIG. 1 shows one embodiment of a holding apparatus according to aspects of the invention in a perspective illustration.
Figure 2:
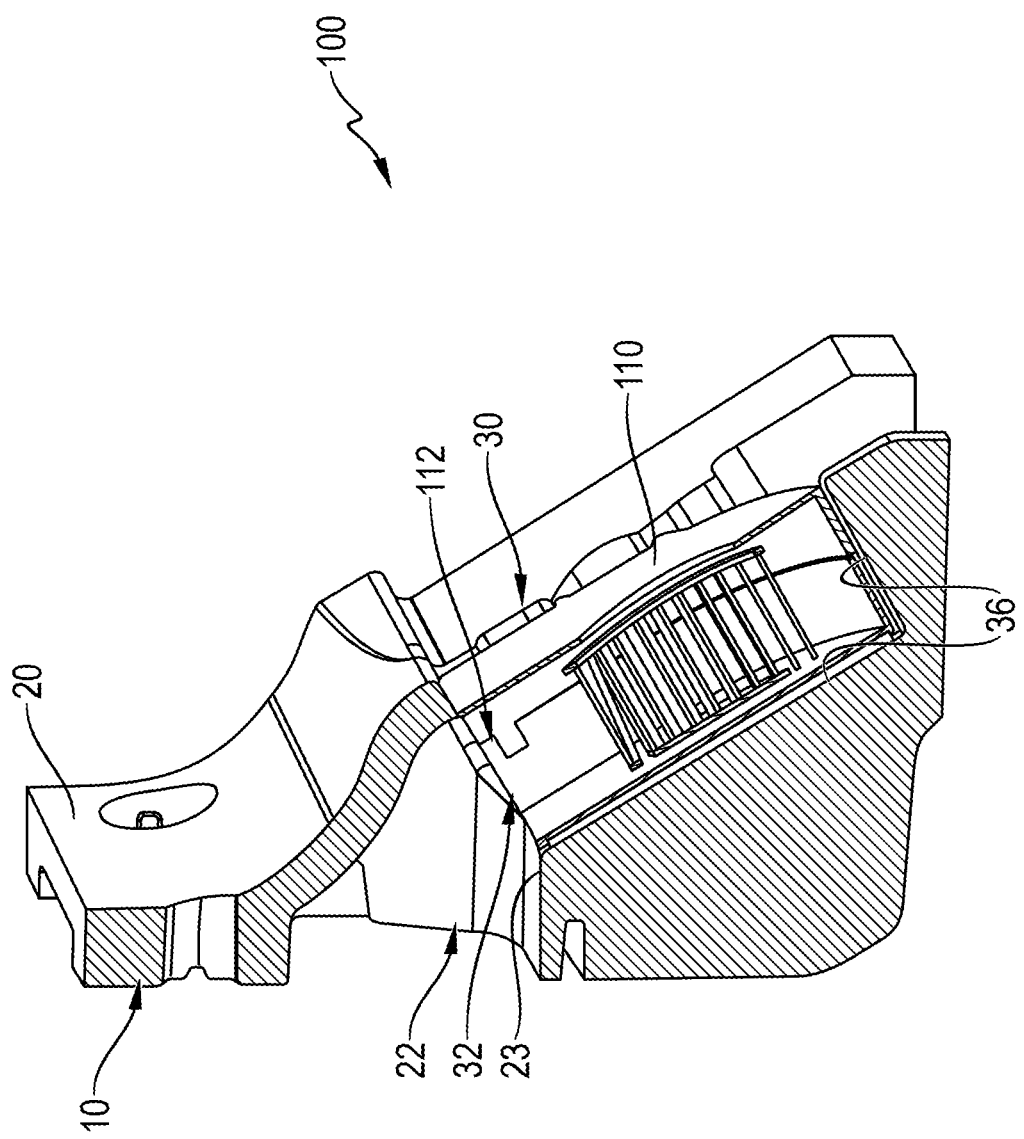
FIG. 2 shows the embodiment from FIG. 1 in a partial section.
Figure 3:
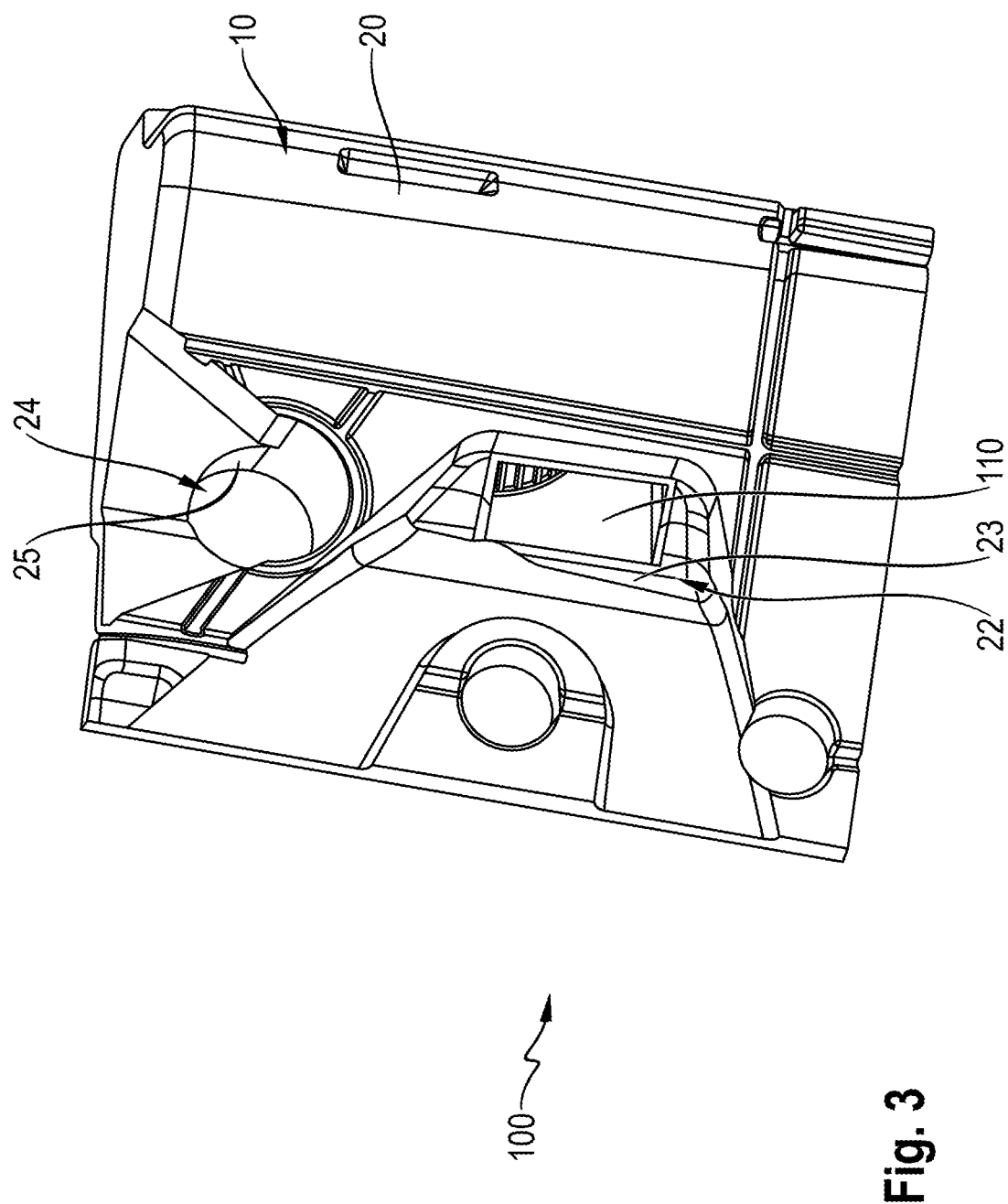
FIG. 3 shows the embodiments from FIGS. 1 and 2 in a different view.

FIGS. 1 to 3 show one embodiment of a holding apparatus 10 according to aspects of the invention, into which a fan 110 is inserted. The combination between the fan 110 and the holding apparatus 10 therefore results in one option for a fan module 100.

As can be seen clearly, the fan 110 is inserted into a fan receptacle 30 within the main body 20, made from a foam material, of the holding apparatus 10. The foam material of the main body 20 is preferably equipped at least partially with an elastic matrix, with the result that the position (shown in FIGS. 1 to 3) of the fan 110 can be achieved by way of simple elastic deformation of the main body 20.

In order for it to be possible to provide a guidance functionality for an air flow, the main body 20 is provided firstly with an inlet opening 22. An inlet duct 23 which provides a fluid-communicating connection to an air inlet 32 is adjacent with respect to said inlet opening 22. In the inserted state of the fan 110, the blower inlet 112 of the fan 110 then bears against said air inlet 32. As can be gathered, in particular, from FIG. 2, an intake of cold air can then take place via said guidance functionality of the inlet duct 23 and the inlet opening 22 into the fan 110 during a rotation of the fan impeller of the fan 110.

In order to output the sucked-in air again as an air flow and in order for it to be possible to blow it, in particular in a directed way, onto a component to be cooled, a fan outlet 114 can be seen on the fan 110. Via said fan outlet 114, an outlet duct 25 is then fed with the air flow with the aid of an air outlet 34 from the fan receptacle 30. The outlet duct 25 opens into an outlet opening 24 which provides a guidance functionality for the air flow, in particular in a directed manner, and therefore orients the cooling air flow onto the component to be cooled of the vehicle.

As can likewise be seen, at least two additional sections are also provided on the outer side 40 of the main body 20. Fastening sections 42 are provided via two holes, which fastening sections 42 permit fastening of the main body 20 to a surrounding structural component of the vehicle. In order for it to be possible, moreover, to ensure relative positioning of the main body 20 and therefore also of the fan 110 which is received therein in a positively locking manner, a flat positioning section 44 is also provided here which provides a positioning functionality during the fastening of the holding apparatus 10 in the vehicle. In this way, not only the fan 110, but rather also the orientation of the outlet opening 24, are automatically positioned in a defined manner relatively correctly with respect to the component to be cooled.

The above explanation of the embodiments describes the present invention exclusively within the context of examples. It goes without saying that individual features of the embodiments can be combined freely with one another, insofar as technically appropriate, without departing from the scope of the present invention.

What is claimed is:

1. A holding apparatus for securing a fan for cooling a component of a vehicle, the holding apparatus comprising:
   a main body having a fan receptacle for receiving the fan in a positively locking manner, and the fan receptacle having (i) an air inlet through which air is delivered into the main body and for feeding in air to the fan, and (ii) an air outlet for discharging air from the fan, the fan receptacle configured and sized to undergo elastic deformation upon receiving the fan,
   the main body having at least one inlet opening with an adjoining inlet duct and at least one outlet opening with an adjoining outlet duct, the inlet duct being in a fluid-communicating connection with the air inlet and the outlet duct being in a fluid-communicating connection with the air outlet,
   wherein the air inlet and air outlet openings are disposed on a same side of the main body.

2. The holding apparatus as claimed in claim 1, wherein the fan receptacle for receiving the fan in a positively locking manner has at least one positively locking section, the positively locking section having the air inlet or the air outlet.

3. The holding apparatus as claimed in claim 1, wherein, an outer side of the main body has at least one fastening section for fastening to the vehicle.

4. The holding apparatus as claimed in claim 1, wherein, an outer side of the main body has at least one positioning section for relative positioning of the holding apparatus in the vehicle.

5. The holding apparatus as claimed in claim 1, wherein the main body has at least two outlet openings, the outlet duct having two part outlet ducts which open into the two outlet openings.

6. The holding apparatus as claimed in claim 1, wherein the at least one outlet opening has a nozzle-shaped cross section for a directed or accelerated output of air flow.

7. The holding apparatus as claimed in claim 1, wherein the main body is made from foam material and at least a portion of the foam material of the main body has an elastic matrix.

8. The holding apparatus as claimed in claim 1, wherein the main body is composed of either Polyurethane (PUR) or Polyphenylene Ether (PPE).

9. A fan module for cooling a component of a vehicle, the fan module comprising the holding apparatus of claim 1 and the fan, the fan being arranged in the fan receptacle, the fan having a blower outlet in a fluid-communicating connection with the air outlet and the fan having a blower inlet in a fluid-communicating connection with the air inlet.

10. A method for mounting the fan module of claim 9, comprising:
    inserting the fan into the fan receptacle of the holding apparatus, and
    configuring the positively locking connection between the fan and the fan receptacle.

11. The holding apparatus as claimed in claim 1, wherein the fan receptacle is disposed on one side of the main body, and the inlet and outlet openings are provided on a different side of the main body.

12. The holding apparatus as claimed in claim 1, wherein the outlet opening is disposed on two different sides of the main body.

13. The holding apparatus as claimed in claim 1, wherein the inlet opening and the outlet opening have different cross-sections.

14. The holding apparatus as claimed in claim 1, wherein different sections of the main body have a different modulus of elasticity.

15. The holding apparatus as claimed in claim 1, wherein only a section of the main body is configured and sized to undergo elastic deformation upon receiving the fan.

* * * * *